United States Patent [19]

Guglielmi et al.

[11] Patent Number: 5,592,516
[45] Date of Patent: Jan. 7, 1997

[54] METHOD AND CIRCUITS FOR COMBINING BASEBAND SIGNALS AND RECOVERY OF CLOCK TIMING

[75] Inventors: Franco Guglielmi, Milan; Carlo Luschi, Maria Hoè ; Arnaldo Spalvieri, Milan, all of Italy

[73] Assignee: Alcatel Italia S.P.A., Milan, Italy

[21] Appl. No.: 270,140

[22] Filed: Jul. 1, 1994

[30] Foreign Application Priority Data

Jul. 2, 1993 [IT] Italy .................................. MI93A1428

[51] Int. Cl.$^6$ ................................ H04L 1/02; H04L 7/00
[52] U.S. Cl. ........................ 375/347; 375/350; 375/355; 455/137
[58] Field of Search .............................. 375/40, 100, 99, 375/101, 58, 14, 106, 267, 261, 326, 355, 350, 347, 340; 455/137–139, 273

[56] References Cited

U.S. PATENT DOCUMENTS

| | | | |
|---|---|---|---|
| 4,512,034 | 4/1985 | Greenstein et al. | 455/139 |
| 4,797,950 | 1/1989 | Rilling | 455/139 |

OTHER PUBLICATIONS

"Blind Algorithm for Joint Clock recovery and baseband Combining in Digital Radio" F. Gudielmi et al, IEEE Radio Relay System, 1993, pp. 279–286.

Interference Rejection. "Using Time Constant Modulus Algorithm (CAM) and Hybrid CMA/Spectral Correlation Discriminator", R. Uendozo et al, IEEE Tran on Srg. processing, 1991, pp. 2108–2111.

"Joint Blind Equalization, Carrier Recovery, and Timing Recovery for 64 of 128 QAM Signal Consellation" Neil K. Jablen, IEEE International Conf., 1989, pp. 1043–1049.

"Decision Directed Diversity Combiners Principles and Simulation Results" by J. A. Henriksson published in IEEE Journal on Selected Areas in Communications, vol. SAC–5, No. 3, Apr. 1987.

"MMSE baseband combiner for microwave digital radio" by A. N. D'Avolio, et al published in Conference Record, 2nd European Conference on Radio Relay System, pp. 235–242, Apr. 1989.

"Convergence Behaviours of the Constant Modulus Algorithm" by M. G. Larimore et al, published in Conference Record, IEEE Int. Conference on Acoustic Speech Signal Processing, pp. 13–16, Apr. 1983.

Electronics & Communications in Japan, Part I —Communications, vol. 74, No. 9, Sep. 1991, New York US, pp. 43–53.

XP00029159, T. Ohgane, "Characteristics of CMA Adaptive Array for Selective Fading Compensation in Digital Land Mobile Radio Communications".

Proceedings of 1986 IEEE Military Communications Conference –Milcom '86, 5–9 Oct. 1986, Monterey, CA pp. 47.3 1–47 3.5.

J. Treichler and M. G. Larimore, "CMA–BAsed Techniques for Adaptive Interface Rejection".

*Primary Examiner*—Stephen Chin
*Assistant Examiner*—Tesfaldet Bocure
*Attorney, Agent, or Firm*—Ware, Fressola, Van Der Sluys & Adolphson

[57] ABSTRACT

The invention relates to a baseband signal combiner and to a sampler typically used in radio relay systems and also in generic communication systems. In order to avoid temporary failures in the free space links, space and/or frequency diversity techniques are used, which consist in the use of two suitably spaced receive antennas or of two transmission frequencies. By suitably combining the signals thus received, the failures in radio links can be redued. The invention provides the use of a particular algorithm of the type CMA (Constant Modulus Algorithm) which, being independent of the combined signal phase, does not interact with the carrier recovery circuits. Moreover, by also applying the same algorithm to the sampler, the cooperation of the two circuits for the optimization of the output signal is obtained.

10 Claims, 2 Drawing Sheets

METHOD AND CIRCUITS FOR COMBINING BASEBAND SIGNALS AND RECOVERY OF CLOCK TIMING

TECHNICAL FIELD

The invention relates to a baseband signal combiner and to a sampler to be used typically in radio relay systems but also in generic communication systems.

BACKGROUND OF THE INVENTION

One of the drawbacks often occurring in free-space links is the multipath phenomenon. In these circumstances the signal available across the receiving antenna is a combination of various delayed and/or attenuated signals. This combination of signals, in some instances, can lead to the impossibility of maintaining the link. A common remedy to this drawback is to resort to space and/or frequency diversity techniques that consist in the use of two suitably spaced antennas for reception or the use of two transmission frequencies. By suitably combining the two received signals, the above-mentioned drawbacks can be compensated.

One of the first works on baseband combiners is known from the article "Decision Directed Diversity Combiners Principles and Simulation Results" by J. A. Henriksson published in IEEE Journal On Selected Areas in Communications, Vol. SAC-5, No. 3, April 1987, which suggests to minimize the mean square error (MMSE) at the output of the combiner in order to combine at best the two received signals. It also introduces the use of the so-called "Minimum Projection Strategy" which consists in minimizing the mean square deflection between the received signal and the desired reference direction.

In the article "MMSE baseband combiner for microwave digital radio" by D' Andrea, M. Mariano, U. Mengali, A. Spalvieri, published in Conference Record, 2nd European Conference on Radio Relay System pages 235–242, April 1989, there is disclosed a combiner using the MMSE technique that provides a solution to the timing of the sampler by using a special algorithm. In both works some aspects are not investigated thoroughly. The first aspect is relative to the interaction between the combiner/sampler and the carrier recovery circuit present in the demodulator. A second aspect is relative to the actual cooperation of the combiner and of the sampler with particular regard to the capacity of convering to the optimal condition of operation.

SUMMARY OF THE INVENTION

Therefore it is an object of the present invention to overcome the prior art drawbacks, using a special algorithm which allows the combiner to reach the optimal condition of operation, thus avoiding the interaction with the carrier recovery circuits. The invention is directed to a method of obtaining a combined signal from at least two basebands complex signals including the steps of multiplying at least one signal by a coefficient and summing the signals, characterized in that said coefficient is determined by operating on said combined signal independently of its phase.

The invention is also directed to a baseband complex signal combiner of the type comprising at least one multiplier and an adder, characterized in that said multiplier multiplies the signal by a coefficient is determined by operating on said combined signal independently of its phase.

Finally, the invention is directed to a communication system including a baseband complex signal combiner of the type comprising at least one multiplier and an adder, characterized in that said multiplier multiples the signal by a coefficient which is determined by operating on said combined signal independently of its phase. Further advantageous aspects of the present invention are set forth in the subclaims.

By using an algorithm independent of the combined signal phase allows the avoidance of interaction with the carrier recovery circuits. Moeover, the application of the same algorithm of the combiner also to the sampler allow the recovery of the clock timing apart from the recovery of the carrier. A further advantage of the application of the same algorithm both to the combiner and to the sampler is given by the cooperation of the two circuits to the optimization of the output signal. For the calculation of the coefficients necessary to the combination of the two signals and for the calculation of the sampling instants, a cost function is used among those of the CMA (Constant Modulus Algorithm) family, already used in equalizers as disclosed, e.g., in the article "Convergence Behaviours of the Constant Modulus Algorithm" by M. G. Larimore and J. R. Treichler, published in Conf. Record, IEEE Int. Conf. on Acoustic Speech Signal Processing, pages 13–16, April 1983. Such a function carries out an evaluation of the mean deviation of the signal modulus from a prefixed level and therefore it is not affected by the phase of the received signals.

BRIEF DESCRIPTION OF THE DRAWINGS

The present invention will become more apparent from the following description of a not limiting embodiment thereof taken in conjunction with the attached drawings in which:

In FIG. 1 the baseband combiner and the diversity signal samplers are shown in the event of only two signals for simplicity.

BEST MODE FOR CARRYING OUT THE INVENTION

Figure 1:
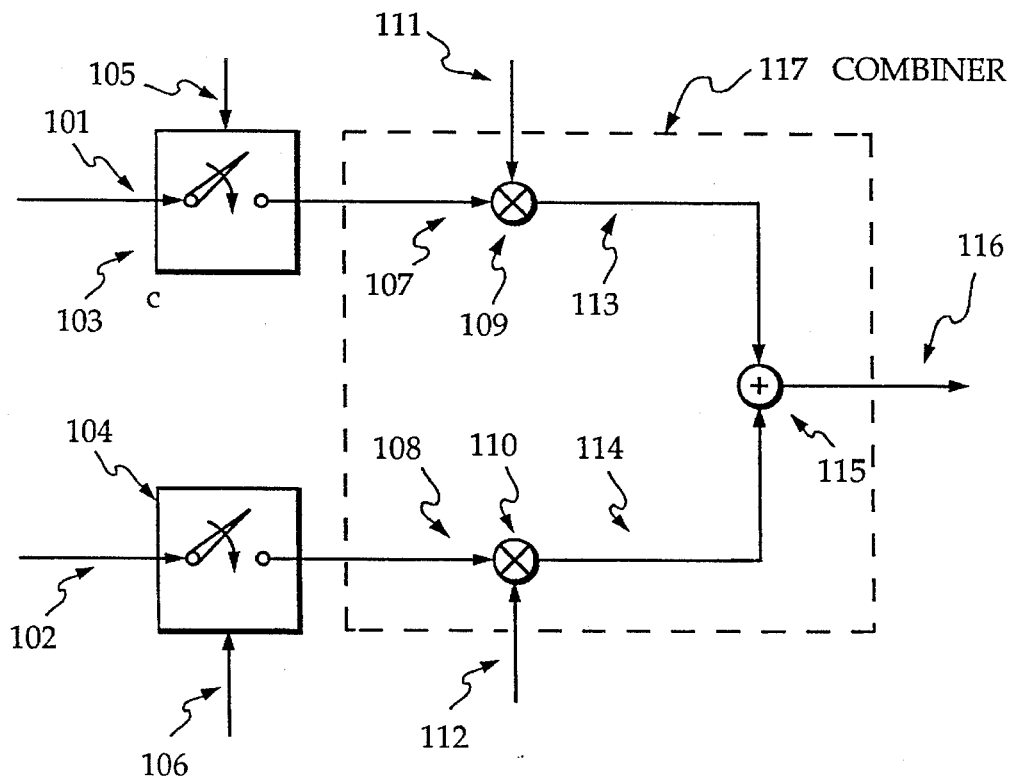
FIG. 1 is a block diagram illustrating the connection of the combiner with the samplers of the two diversity complex signals.

As seen in FIG. 1, signals 101 and 102 are diversity received, suitably processed and baseband converted signals. Each of the two signals is formed by a phase coincidence component and a quadrature component and therefore it can be represented as a complex signal.

Signal 101 is fed to the input of a sampling circuit 103 which is composed of two separated devices acting respectively upon the phase coincidence part and upon the quadrature part of the input signal. Both devices are driven by the unique sync signal 105. The sampling circuit 103 provides at its output 107 the samples, eventually quantized, of the input signal at the instants established by the sync signal 105.

In a similar manner the complex signal 102 is fed to the input of a sampling circuit 104, quite identical to sampling circuit 103, driven by sync signal 106. Output 108 is constituted by the samples of signal 102.

Signals 107 and 108 are fed to the input of a combiner 117 which provides at its complex output 116 a suitable linear combination of the inputs, according to the complex coefficients 111 and 112. In particular, the complex signal 107 is multiplied by the coefficient 111 in the complex multiplier 109; the complex signal 108 is multiplied by the coefficient 112 in the complex multiplier; the complex products 113 and 114 thus obtained are summed in the complex adder 115 providing the combined signal 116.

In what has been set forth, it is to be understood that a complex multiplier can be realized through four real multipliers and two real summers; similarly a complex adder is formed by two adders that act respectively upon the real and imaginary parts.

The algorithms for adapting the combiner coefficients 111 and 112 and of the sync signals 105 and 106 are based upon the minimization of a cost function CMA p-q at the output of the combiner, with the method of the stochastic gradient which is a method of iterative minimization based upon a noisy estimate of the cost function gradient.

This family of cost functions has a double advantage of allowing the acquisition apart from the availability of a data estimate and of being independent of the signal phase thus avoiding any interaction with the circuits devoted to the carrier recovery. Moreover, the application of the same cost function both to the combiner coefficients and to the sync signals assures their cooperation.

Let $y_k$ be the samples 116 at the output of the combiner, the expression of the cost function CMA p-q is:

$$J_{pq}=E\{||y_k|^p-\delta_p|^q\} \quad (1)$$

where p and q are positive real numbers, $\delta_p$ is a positive real constant and $E\{\bullet\}$ denotes the stochastic average operation.

From a realization point of view it is particularly convenient to choose p=2, q=1, to which reference will be made for simplicity in the following discussion. In this case, the application of the stochastic gradient method to the function (1) leads to the following algorithms for the updating of the combiner coefficients and the instants of sampling.

For the combiner coefficients one obtains:

$$c_1^{(k+1)}=c_1^{(k)}-\gamma_c x^*_{1k} y_k \text{ sign}[|y_k|^2-\delta_2] \quad (2)$$

$$c_2^{(k+1)}=c_2^{(k)}-\gamma_c x^*_{2k} y_k \text{ sign}[|y_k|^2-\delta_2] \quad (3)$$

where $C_1^{(k)}$ and $C_2^{(k)}$ denote the complex coefficients 111 and 112 of FIG. 1 before updating, $C_1^{(k+1)}$ and $C_2^{(k+1)}$ denote the values of the same coefficients after updating, $\gamma_c$ is a positive real constant (step size) that affects the convergence rate and the noiseness of the algorithm in steady condition, $x_{1k}$ and $x_{2k}$ represent the sampled signals 107 and 108, $(\bullet)^*$ denotes the complex conjugate relation, sign [•] denotes the sign operator, $y_k$ is the combined signal 116 and $\delta_2$ is a suitable real constant contained in the definition of CMA function, dependent upon the statistics of the transmitted signal.

Similarly, for the updating of the sampling instants one has:

$$t_1^{(k+1)}=t_1^{(k)}-\gamma_t Re\{c_1^* \dot{x}_{1k}^* y_k \text{ sign } [|y_k|^2-\delta_2]\} \quad (4)$$

$$t_2^{(k+1)}=t_2^{(k)}-\gamma_t Re\{c_2^* \dot{x}_{2k}^* y_k \text{ sign } [|y_k|^2-\delta_2]\} \quad (5)$$

where $t_1^{(k)}$ and $t_2^{(k)}$ denote the sampling instants for signals 111 and 112 of FIG. 1 before updating, $t_1^{(k+1)}$ and $t_2^{(k+1)}$ denote the values of the sampling instants after updating, $\gamma_t$ is the step size (similar to $\gamma_c$), $\dot{c}_1 x_{1k}$ and $\dot{c}_2 x_{2k}$ denote the derivatives with respect to time of signal 113 and of signal 114 respectively, Re{•} denote the real part of the complex number and the other symbols have the same meaning as in equations (2) and (3). The sampling instants $t_1$ and $t_2$ correspond to the phase of the sync signals 105 and 106.

Figure 2:
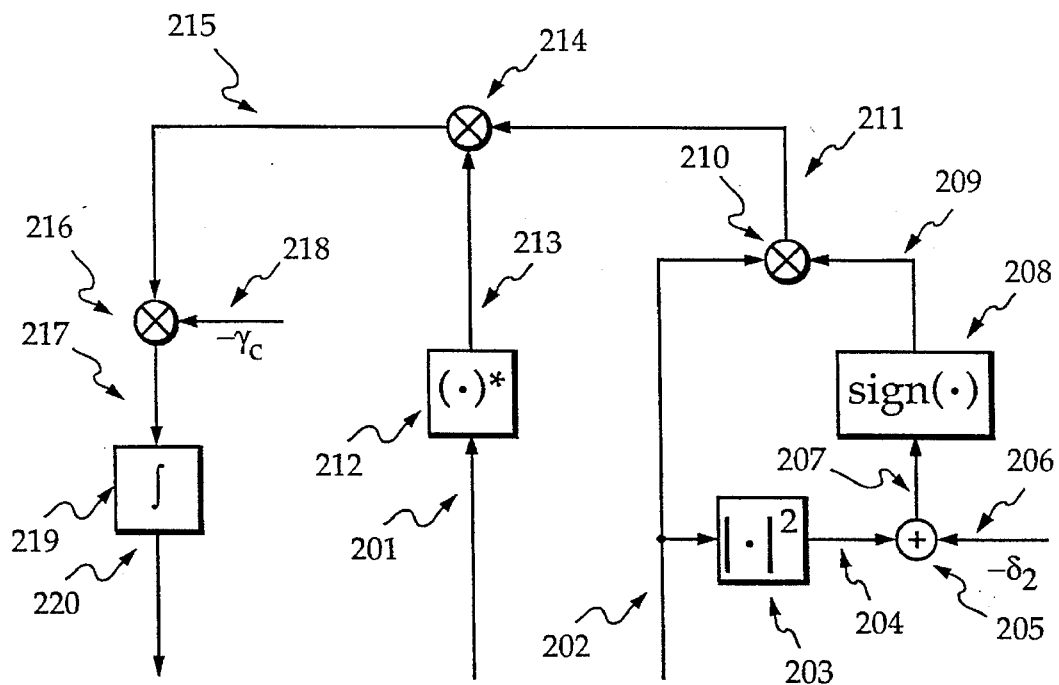
FIG. 2 is a block diagram of the circuit controlling the single coefficient of the combiner (special case of application of the cost function CMA 2-1)
Figure 3:
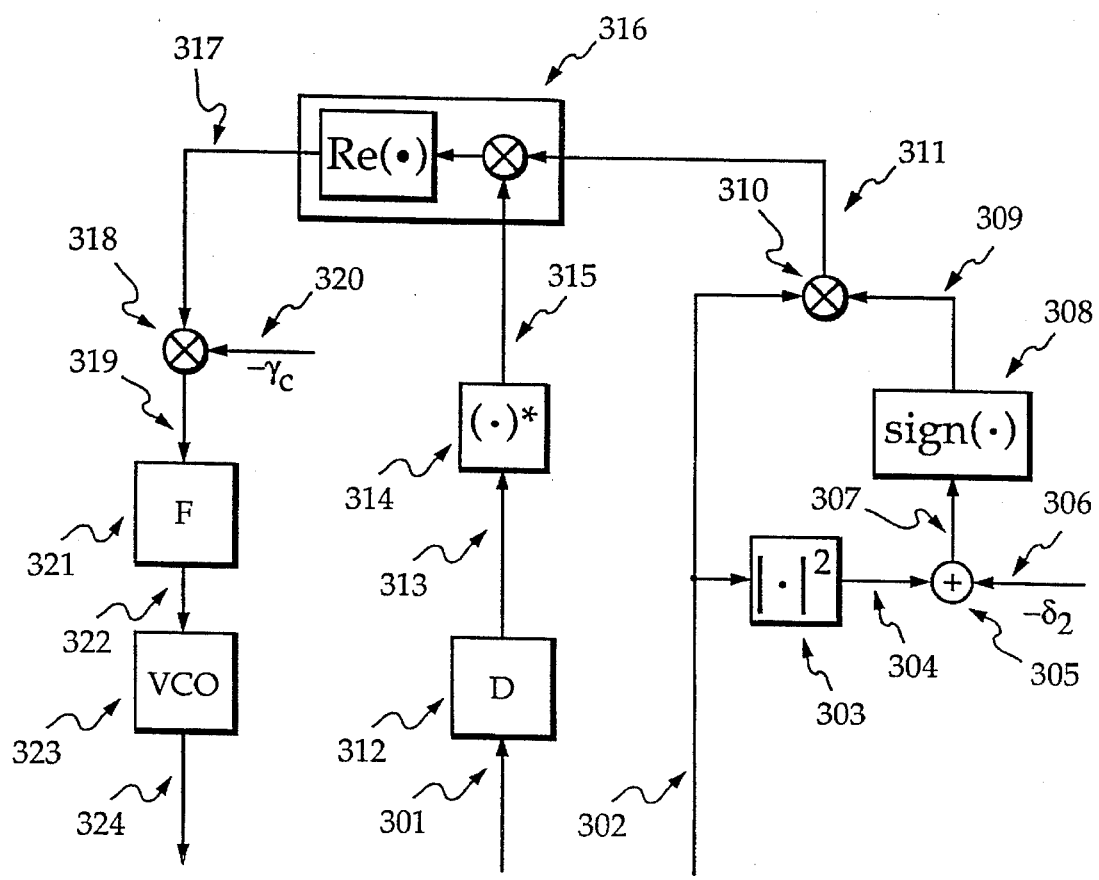
FIG. 3 is a block diagram of the clock timing extract circuit for the diversity single signal at the input of the combiner (special case of application of the cost function CMA 2-1).

The block diagrams of a possible implementation of algorithms (2) and (5) are illustrated in FIG. 2 and FIG. 3.

FIG. 2 is a block diagram of the circuit controlling the coefficient $c_1$ (signal 111 in FIG. 1).

Signal 201 is the input signal of the combiner (complex signal 107 in FIG. 1). Signal 202 corresponds to combined complex signal 116 in FIG. 1.

Signal 202 is fed to the input of squaring block 203 which calculates its squared value, producing the real output 204 that constitutes the input of the real adder 20S. The other input 206 of adder 20S is given by the constant $\delta_2$ with its sign reversed: the result 207 of the summation performed by adder 205 is sent to the input of block 208 which calculates its sign 209.

The multiplier 210 performs the product of the complex signal 202 with the real signal 209. Such product constitutes the complex signal 211.

Signal 201 is applied to the input of block 212 which calculates its complex conjugate providing it at the output 213. Multiplier 214 calculates the product 215 of complex signals 211 and 213.

Multiplier 216 calculates the product 217 of the complex signal 215 with the real constant $\gamma_c$ (signal 218). Block 219 calculates the integral of the input complex signal 217, thus producing the complex output 220 that corresponds to signal 111 of FIG. 1.

The circuit controlling the coefficient C2 (signal 112 of FIG. 1) is quite similar to the one of FIG. 2; applied to input 201 is now signal 108 of FIG. 1 and, correspondingly, the output 220 coincides with signal 112 of FIG. 1.

FIG. 3 is a block diagram of the circuit generating the sync signal 105 of FIG. 1 whose phase determines the sampling instant t1.

Signal 301 is the signal $c_1 x_{1k}$ (complex signal 113 of FIG. 1) Signal 302 corresponds to the complex signal at the output of the combiner (signal 116 of squaring FIG. 1).

Signal 302 is fed to the input of block 303 which calculates its squared value, providing the real output 304 that constitutes the input of the real adder 305. The other input 306 of the adder 305 is given by the constant $\delta_2$ with its sign reversed: the result 307 of the summation performed by adder 305 is fed to the input of block 308 that calculates its sign 309.

Multiplier 310 performs the product of the complex signal 302 with the real signal 309. Such product constitutes the complex signal 311.

Signal 301 is fed to block 312 which calculates its derivative with respect to time and provides it at the output 313. The complex signal 313 is conjugated in block 314 to generate signal 315.

Block 316 calculates the real part of the product 317 of the complex signals 311 and 315.

The multiplier 318 calculates the product 319 of the signal 317 with the real constant $\gamma_t$ (signal 320).

Signal 319, eventually filtered by block 321, is fed to the input 322 of the voltage controlled oscillator 323; the latter generates the sync signal 324 that corresponds to signal 105 in FIG. 1.

The circuit for generating the sync signal 106 of FIG. 1 is quite similar to the one of FIG. 3; the input 301 in this circumstance corresponds to the complex signal 114 of FIG. 1, while the output 324 is the sync signal 106 of FIG. 1.

It is evident that this embodiment is susceptible to variations, replacements and modifications naturally all falling within the inventive concept of the present invention. For instance, an embodiment with two inputs has been described herein for simplicity, but the invention can be used also in realizations with several inputs.

What is claimed is:

1. A method of combining at least two baseband complex signals into a combined signal having a combined signal phase, comprising the steps of:

multiplying at least one of said at least two baseband complex signals by a feedback multiplying coefficient, for providing at least one multiplied baseband complex signal;

summing said at least one multiplied baseband complex signal with another of said at least two baseband signals, for providing the combined signal; and determining said feedback multiplying coefficient by operating on said combined signal independently of the combined signal phase.

2. A method according to claim 1, wherein the step of determining said feedback multiplying coefficient is determined by minimizing a function of the CMA (Constant Modulus Algorithm) family.

3. A method according to claim 2, wherein the step of determining includes using a CMA function of the type with p=2 and q=1.

4. A method according to claim 2, wherein the method further comprises the step of updating said feedback multiplying coefficient and said sampling instants by using a stochastic gradient of the CMA (Constant Modulus Algorithm) function.

5. A method according to claim 1, wherein the method further comprises the step of sampling said at least two baseband complex signals before the steps of multiplying and summing, and determining sampling instants of said step of sampling by operating on said combined signal independently of the combined signal phase.

6. A method according to claim 5, wherein the step of determining said sampling instants by minimizing a function of the CMA (Constant Modulus Algorithm) family.

7. A method according to claim 6, wherein the step of determining includes using a CMA function of the type with p=2 and q=1.

8. A method according to claim 6, wherein the method further comprises the step of updating said feedback coefficient and said sampling instants by using a stochastic gradient of the CMA (Constant Modulus Algorithm) function.

9. A baseband complex signal combiner for combining at least two baseband complex signals, for providing a combined signal having a combined signal phase, comprising:

at least one multiplier, for multiplying at least one of the two baseband complex signals by a feedback multiplying coefficient, for providing at least one multiplied baseband complex signal;

an adder, for adding said at least one multiplied baseband complex signal and another of said at least two baseband signals, for providing the combined signal; and means for determining said feedback multiplying coefficient by operating on said combined signal independently of the combined signal phase.

10. A baseband complex signal combiner according to claim 9, wherein said baseband complex signal combiner further comprises:

sampling means for sampling with sampling instants said at least two baseband complex signals, for providing at least two sampled baseband complex signals; and means for determining the sampling instants by operating on said combined signal independently of the combined signal phase.

* * * * *